Jan. 17, 1928. 1,656,317
E. R. BURTNETT
INTERNAL COMBUSTION ENGINE
Filed Nov. 6, 1926  2 Sheets-Sheet 2
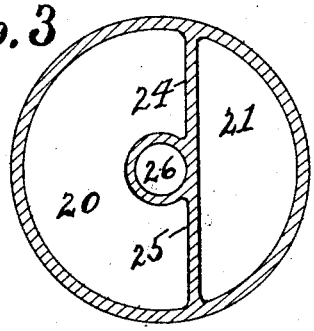
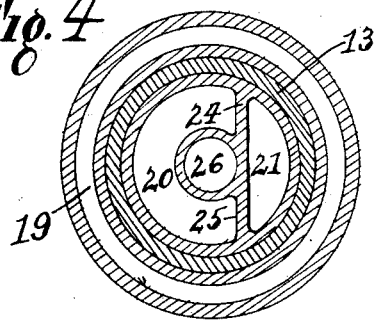
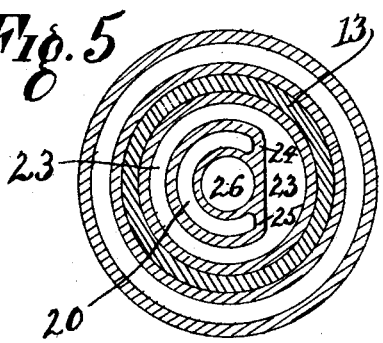
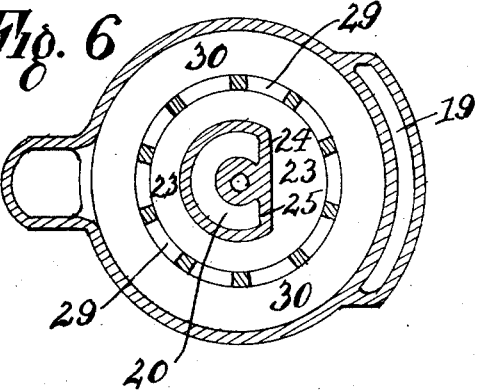
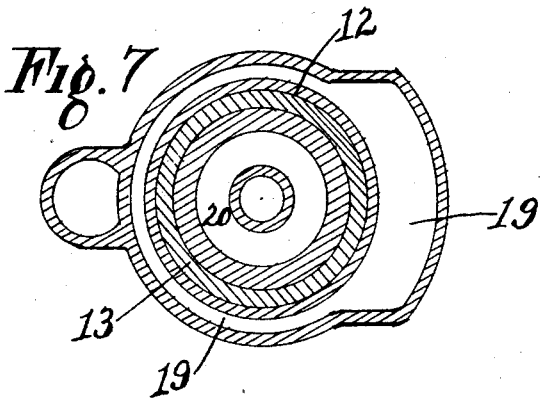
*Everett R. Burtnett*
INVENTOR Patented Jan. 17, 1928.

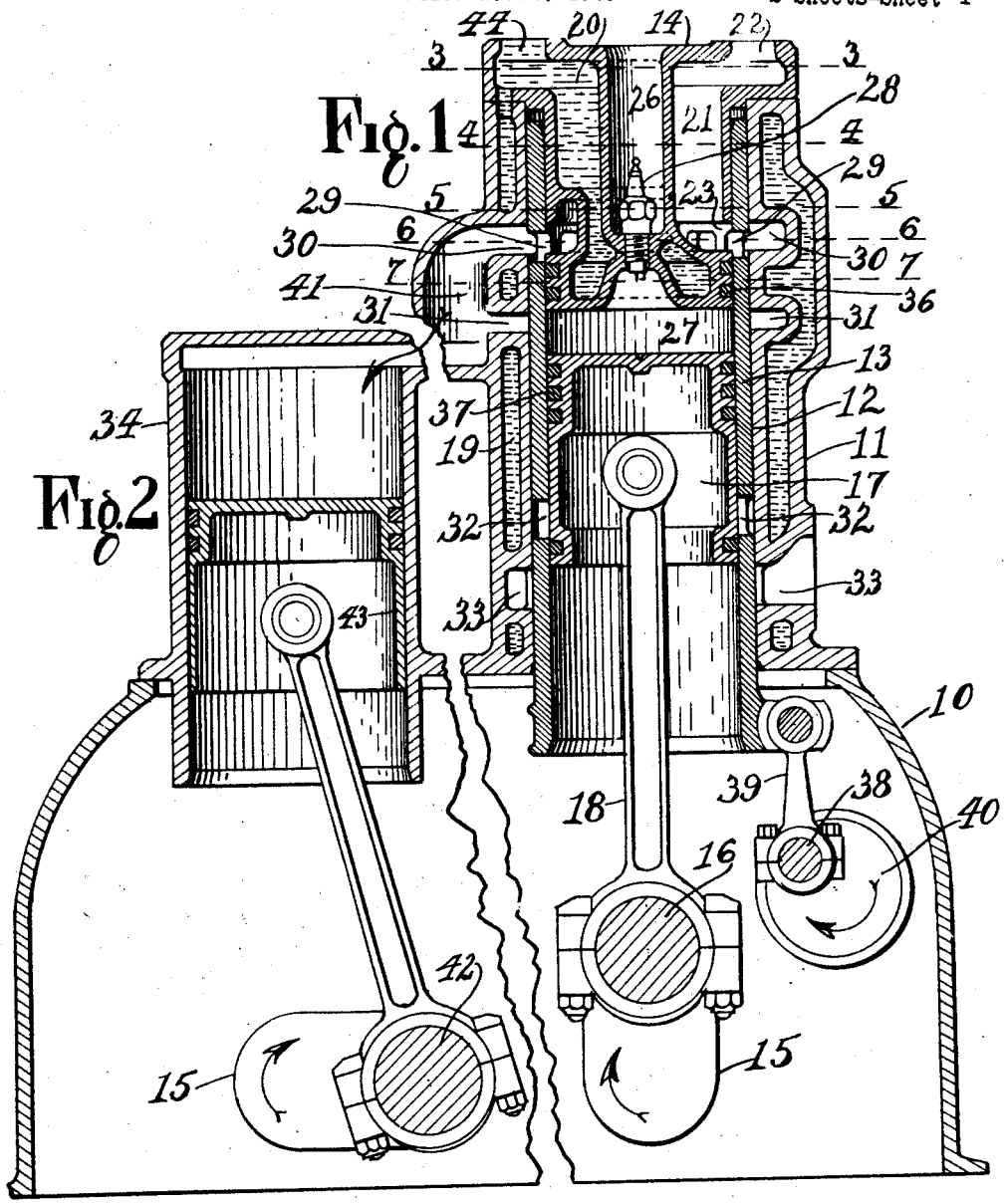

1,656,317

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CORPORATION, OF RENO, NEVADA, A CORPORATION OF NEVADA.

INTERNAL-COMBUSTION ENGINE.

Application filed November 6, 1926. Serial No. 146,606.

My invention relates to internal combustion engines of the two stroke cycle type and the principal objects of my invention are, to provide a two stroke cycle internal combustion engine having a cylinder, a sleeve valve arranged within the cylinder, a cylinder head arranged in a depending manner within the sleeve valve and fresh charge inlet passage means provided within the depending cylinder head, there being a valved port of the cylinder head, for the registration of fresh charge inlet duct communication at the desired time, also a valved port of the cylinder for the admission of fresh charge into the combustion chamber and another valved port of the cylinder for the exhaust of the spent products of combustion from the combustion chamber.

A further object of my invention is the provision of an engine having one sleeve valve with two series of ports, providing the desired valve function to the three ports described, to provide an engine in which a burning function takes place within the combustion chamber once to each two stroke cycle and in which the metal areas forming the walls for the combustion chamber may be adequately cooled, simple of design and of minimum cost of production, operation and maintenance.

With the foregoing and other objects in view, my invention consists in the combination of a cylinder within which a sleeve valve is arranged for reciprocatory movement, a piston arranged for reciprocatory movement within the sleeve valve, means of actuating the sleeve valve in stroke relation in ratio one to one with the stroke movement of the piston within the sleeve valve, of a cylinder head formed in a depending manner within the sleeve valve and in such a way as to permit the sleeve valve reciprocating in a telescopic manner over the periphery of the cylinder head, a fresh charge inlet duct being formed through the cylinder head extending from an opening in the outward end of the cylinder head to an annular formed port opening through the periphery of the cylinder head at the end adjacent to the combustion chamber, of an annular formed port arranged in the cylinder in the same plane as is the annular port of the inlet duct in the cylinder head, of an annular formed port arranged in the cylinder in the same plane as the space first crankwardly of the inward combustion chamber end of the cylinder head, of an annular port arranged in the cylinder in the same plane as the space directly headward of the head of the piston arranged for reciprocatory movement within the sleeve valve of the engine when the said piston is in a position of crank-end dead center of a series of ports formed in the sleeve valve and adapted to register with the first two described annular ports in the cylinder, the first being the valve function to the fresh charge movement through the cylinder head enroute to a pumping chamber, an illustration of which pumping chamber is given of the piston type in this case in Fig. 2, the second being the valve function to the fresh charge movement from the fresh change pumping chamber into the combustion chamber, a second series of ports being formed in the sleeve valve and adapted to register port passage communication between the combustion chamber within the sleeve valve and the third annular port formed in the cylinder described as being located in the plane directly headward of the plane of the head of the piston when said piston is in a position of crank end dead center, this second series of ports formed in the sleeve valve being the exhaust ports and of ignition means located in the cylinder head with sparking electrodes extending into the combustion chamber.

Fig. 1 is a vertical section taken transversely of the engine, the cutting line being taken through the center of the combustion chamber, cylinder head, sleeve valve and cylinder.

Fig. 2 is a vertical section taken transversely of the engine, the cutting line being of the center of the cylinder illustrating a fresh charge pump of the piston type.

Fig. 3 is a horizontal section taken on line 3—3 of Fig. 1.

Fig. 4 is a horizontal section taken on line 4—4 of Fig. 1.

Fig. 5 is a horizontal section taken on line 5—5 of Fig. 1.

Fig. 6 is a horizontal section taken on line 6—6 of Fig. 1.

Fig. 7 is a horizontal section taken on line 7—7 of Fig. 1.

Referring by numerals to the accompanying drawings, 10 designates a suitably formed crank case, to which a cylinder block 11 is secured, a cylinder 12 is formed within the block 11, a sleeve valve 13 is arranged for reciprocatory movement within the cylinder 12, a depending cylinder head 14 is secured to the head end of the cylinder block 11 and extends crankwardly within the sleeve valve 13.

A crank shaft 15 is arranged in the crank case 10, of which is formed a crank pin 16, a piston 17 is arranged for reciprocatory movement within the sleeve valve 13, the piston 17 being connected to the crank pin 16 by means of a connecting rod 18. A cooling fluid cell 19 is formed in the cylinder block 11 and extends around the cylinder 12, a cooling fluid cell 20 is formed in the cylinder head 14 extending from end to end of the cylinder head, and being in communication with the cooling fluid cell 19 of the cylinder block, an opening 44 of the said cooling fluid cell 20 within the cylinder head is formed at the outer end of the cylinder head.

A fresh charge inlet passage 21 is formed in the cylinder head, an inlet opening 22 of the passage 21 is formed at the outer end of the cylinder head, an annular opening 23 of the fresh charge inlet passage 21 is formed through the periphery of the cylinder head, the inlet passage 21 extending crankwardly through the cylinder head to a point in the plane of the annular opening formed through the periphery of the cylinder head being of restricted area, permitting the cooling fluid cell 20 to extend crankwardly through the cylinder head to the most crankwardly point of the cylinder head, there being partitions 24 and 25 formed through the cylinder head forming the cooling fluid cell 20 and the fresh charge passage 21.

A recess 26 is formed in the center of the cylinder head for the convenience of locating the spark plug 28 immediately in the cylinder head adjacent the combustion chamber 27 which is formed between the cylinder head 14, the piston 17 and within the sleeve valve 13.

A series of ports 29 are formed in an annular row in the sleeve valve 13 at a point relative to the stroke movement of the sleeve valve which will permit the said ports of the sleeve to register a passage communication with the fresh charge passage 21 formed in the cylinder head and an annular opening 30 formed in the cylinder 12 for a time corresponding to the induction period of the fresh charge pumping element associated with the given combustion unit and to cause the said series of ports 29 to register a passage communication with the annular opening 31 of the cylinder 12 and the combustion chamber 27 for a period related to the time of the movement of the piston 17 over crank end dead center, and a second series of ports 32 formed in the sleeve valve 13, the said ports 32 being adapted to register a passage communication between a third annular opening 33 formed in the cylinder 12 for a period in time corresponding to the movement of the piston 17 over crank end dead center, providing a passage for the release of the spent products of combustion from within the combustion chamber 27, when the head of the piston 17 is crankwardly beyond the ports 29 and the annular opening 32.

A pumping cylinder 34 is shown supported by the crank case 10 with a piston 43 arranged for reciprocatory movement within the cylinder 34. It is to be understood that any suitable charge pumping means may be employed, the piston type which I illustrate being shown to promote the conception of the operation of the sleeve valve in valving the fresh charge when admitted through the inlet passage of the cylinder head and the return of the fresh charge volume through the ports 29 of the sleeve valve from the pumping chamber into the combustion chamber.

Expansion rings 36 are arranged on the cylinder head 14 to seal the combustion chamber at the head end, expansion rings 37 are arranged in the usual manner on the piston 17, sealing the combustion chamber on the crank end. A fresh charge duct 41 connects the chamber within the charge pumping cylinder 34 with the valved port 30 and valved port 31.

A crank pin 38 is provided with a connecting link 39 attaching the sleeve valve with a drive shaft 40. It is to be understood the engine being of two stroke cycle function, the valve drive gear may be directly attached to the main crank shaft if desired.

The operation of my improved engine is as follows:

Assuming the parts of the engine to be in the respective positions as indicated in Fig. 1, the piston 17 being at head end dead center, the sleeve valve 13 being in a position corresponding to the position of the valve drive crank pin 38 approximately 40° before head end dead center, the sleeve valve moving at the moment in a headwardly direction, if a charge pumping means is employed of the piston type as illustrated by Fig. 2 the desirable relative position of the crank pin to which the piston of the charge pumping cylinder would be approximately 90° rotatively in advance of the position of the crank pin 16 to which the piston 17 of the combustion chamber is attached, this relative position of the cranks to which the pistons of the associated charge pumping and combustion chambers are connected provides a range of supercharging the combustion chamber with fresh gaseous mixture if desired.

At this moment the influence in the fresh charge pumping chamber is to induct a fresh charge, the source of supply is the inlet passage 41, annular port 30, valve ports 29, the annular fresh charge opening 23 through the periphery of the cylinder head 14 which annular opening 23 is in communication with the inlet passage 21 extending headwardly through the cylinder head to the inlet opening 22 in the cylinder head to which any suitable means of supplying a gaseous mixture may be connected.

At this moment it will be seen that the exhaust ports 32 of the sleeve valve 13 are out of registration with the annular opening 33 of the cylinder 12 through which the spent gases are expelled during the scavenging period of the engine, protecting the periphery of the piston 17, the area of which is subject to the usual thrust due to connecting rod angularity in trunk type assembly from the heat of previously exited spent products of combustion.

It will be seen at this relative position of the parts that the inlet ports 29 of the sleeve valve 13 are headwardly of the expansion rings 36 formed on the cylinder head depending within the sleeve valve, the combustion chamber being at the moment of minimum displacement the spark is caused to take place between the electrodes of the spark plug 28 located in the cylinder head, combustion of a compressed charge takes place in the combustion chamber 27, the resulting expansion driving the piston 17 crankwardly through the cylindrical bore of the sleeve valve which movement in turn develops a rotation of the crank pin 16 of the crank shaft 15 providing the transmission of power.

The sleeve valve continues to be moved headwardly until the crank 38 reaches head end dead center of line intersecting the axis of the shaft 40 and the rocking axis of the link 39, at this moment the crank 16 of the crank shaft 15 will be approximately 40° after head end dead center and the crank 42 of the crank shaft 15 to which the piston 43 of the charge pumping cylinder is connected is in a position approximately 60° before crank end dead center.

Further movement of the piston 17 crankward effects a relative movement of the associated members until the crank 16 to which the piston 17 is connected reaches a rotary position approximately 45° before crank end dead center, at this moment the exhaust ports 32 of the sleeve valve will be in registration with the annular opening 33 in the cylinder and the headward edge of the piston 17 will cross the plane of the headward edge of the exhaust ports 32 of the sleeve valve, establishing an exit passage for the spent products of combustion from within the combustion chamber 27. At this moment the crank 42 to which the piston 43 of the charge pumping chamber is connected is in a position approximately 45° after upper crank end dead center, at which time the inlet ports 29 of the sleeve valve move crankwardly out of registration with the annular opening 30 in the cylinder and the annular opening 23 in the cylinder head, providing a fresh charge volume valve cutoff of approximately 45° opening lag after crank center, a timing of conventional practice.

With a few degrees further rotation of the crank shaft the inlet ports 29 of the sleeve valve move crankwardly into registration with the annular opening 31 formed in the cylinder, providing a valve function for the transfer of the fresh charge from the charge pumping cylinder 34 into the combustion chamber 27, the fresh charge volume transfer influence being developed by the further headward movement of the piston 43 within the pumping cylinder 34, the exhaust ports 32 will remain in registration with the annular opening 33 during the period the charge pumping piston moves through the greater part of its headward stroke, permitting the combustion chamber to be scavenged of the residual gases. Shortly after the piston 17 has passed lower crank end dead center the head edge of the piston 17 will cut off registration between the combustion chamber 27 and the exhaust ports 32 of the sleeve valve, at the time the crank 16 of the crank shaft 15 has reached a position approximately half way between the two dead centers of the cylinder axial line the piston 43 of the charge pumping cylinder 34 will have reached head end dead center, completing the charge pumping displacement elimination stroke at which time the inlet ports 29 of the sleeve valve will have moved headwardly to a position cutting of port registration between the combustion chamber 27 and the annular opening 31. Further movement of the parts result in the compression of the fresh charge within the combustion chamber, the registration of the inlet ports 29 of the sleeve valve with the inlet passage formed in the cylinder head as previously described and the performance of another function as related in the preceding description of the two stroke cycle of the engine.

The movement of the sleeve valve which forms the cylinder for the working piston in the same direction as the movement of the said piston during the time of any great thrust to the cylindrical wall being effected by the angularity of the connecting rod reduces the actual contact stroke movement between the surfaces of the bore of the sleeve valve and the periphery of the piston for a given stroke of the piston and minimizes the friction between these two conventionally highly stressed surfaces, besides the initial thrust of the piston within the sleeve valve reaches the first stages of consequence at the time the direction of reciprocative movement of the sleeve valve is at a reversal point and at which time the reciprocative inertia of the sleeve weight is the greatest, the resulting piston friction tends to oppose the inertia of the sleeve valve, relieving the valve driving gear practically of its greatest stress.

The suction influence present entirely around the outside of the sleeve valve due to the arrangement of the annular inlet openings at the head end of the cylinder will facilitate adequate lubrication of the sleeve valve. The column movement of the incoming cool fresh charge through the cylinder head and the passage of the fresh charge twice through the series of inlet ports formed throughout the entire circumference of the sleeve valve headward of the valve part which is subject to the heat of combustion will assist in heat convection from the sleeve in a uniform manner, the cooling fluid cells arranged within thin walls directly adjacent the one sleeve valve will provide ample cooling for an engine of the two-stroke cycle type permitting the use of high compression and supercharging.

Stratification of a small quantity of fresh charge in the head end of the combustion chamber will be the natural result of the induction taking place at the end of the combustion chamber opposite that which the exhaust ports are located and particularly since the exhaust ports close in advance of the closing of the fresh charge transfer port to the combustion chamber. When the engine is being operated at light load and the volume of fresh charge admitted to the pumping chamber is of a minimum quantity it is obvious that the influence to expel the small volume from the charge pumping chamber will not develop until the rarified condition has been changed to that of a slightly over atmospheric pressure, which cannot occur in the pumping chamber at very light loads until a time the exhaust ports of the combustion chamber have closed, hence a small volume of fresh charge inducted into the combustion chamber after the exhaust ports have closed will not be agitated by exhaust draft and when the total content of the combustion chamber consisting of fresh charge and residual gases are compressed, the fresh charge will remain in a localized form as a strata in the head end of the chamber, it is suggested that a small recess formed in the cylinder head into which the electrodes of the sparking device extend will facilitate regularity of firing and prevent timid initial combustion in the local area of ignition since the fresh charge swept into the recess would not be subject to as great a ratio of residual dilution as the fresh charge would be which was extended over the area of the full cylinder diameter.

Further the induction of the gaseous mixture through the cylinder head provides an inverted flow effect favoring the conveyance of the heavy ends of the mixture into the engine in uniform distribution preventing loading and irregular operation of the engine.

It will be seen that in a multiple cylinder engine of this type a power impulse is developed for each revolution of the crank shaft by the use of two cylinders and one valve, providing in addition a very great range of supercharge high port areas proportionate to the displacement are possible, since the design permits the full circumference of the sleeve valve to be adapted to a singular function.

In an eight cylinder engine of this type there would be four sleeve valves and eight pistons, whereas, in an eight cylinder form stroke cycle engine, if a single sleeve were to be successfully employed there would necessarily be eight sleeve valves,—both engines developing four power impulses to each rotation of the crank shaft once, hence the simplicity and saving in cost of manufacture.

It will be understood that various minor changes in the size, form and construction of my improved two stroke cycle internal combustion engine may be made without departing from the spirit of my invention, the scope of which is set forth in the appended claims.

I claim as my invention:

1. In a two stroke cycle internal combustion engine, a cylinder, two fresh charge and one spent charge openings formed through the said cylinder wall, a sleeve valve arranged for reciprocatory movement within the said cylinder, one series of fresh charge and one series of spent charge openings formed through the said sleeve valve, a cylinder head, the said cylinder head depending from the outer end of the said cylinder and extending within the said sleeve valve, a fresh charge passage way extending through the said cylinder head, the said fresh charge passageway opening headwardly through one end of the head and opening radially through the periphery of the said cylinder head, the radial opening of the fresh charge passage way of the cylinder head and one of the said two fresh charge openings formed in the cylinder being in the same plane, the other of the two fresh charge openings in the cylinder occupying a plane immediately beyond the position of the internal end of the cylinder head extending within the sleeve valve, means of actuating the sleeve valve providing an alternate registration of the fresh charge opening in the sleeve valve with one then the other of the two fresh charge openings in the cylinder and the registration of the spent charge opening in the sleeve valve successively with the spent charge opening in the cylinder once by each two strokes of the sleeve valve.

2. In a two stroke cycle internal combustion engine, a cylinder, a sleeve valve slidably arranged within the cylinder, a piston slidably arranged within the sleeve valve, a crank shaft, a connection between the piston and the crank shaft, a cylinder head, the said cylinder head depending from the end of the cylinder from a point beyond the sleeve valve and extending crankwardly within the sleeve valve, expansion rings located in the periphery of the cylinder head adjacent the end of the said head extending within the sleeve valve, a fresh charge inlet passage formed within the cylinder head, two openings of the said fresh charge passage formed in the cylinder head, one opening formed through the outer end of the cylinder head headwardly beyond the cylinder, the other opening being radially formed through the periphery of the cylinder head at a point immediately headward of the said expansion rings located in the periphery of the end of the cylinder head.

3. In a two stroke cycle internal combustion engine, a cylinder, a cylinder head, the said cylinder head being of smaller diameter than the bore of the cylinder and extending within the cylinder, a sleeve valve arranged for reciprocatory movement within the cylinder and the head of the sleeve valve operating in a telescopic manner between the cylinder head and the cylinder, an annular opening formed in the cylinder in a plane substantially midway of the extending portion of the cylinder head within the sleeve valve, a passageway formed in the cylinder head, openings of the said passageway formed in the cylinder head, one of the said openings being of annular form and extending radially through the periphery of the cylinder head in the same plane as the plane of the said annular opening formed through the cylinder described as being located midway of the length of the portion of the cylinder head extending within the sleeve valve, a combustion chamber formed immediately crankward of the end of the cylinder head extending within the sleeve valve, an annular row of ports formed in the sleeve valve in a single plane and means of actuating the sleeve valve providing the successive alternation of the registration of the said annular row of ports in the sleeve valve with the annular opening in the cylinder head and the annular opening in the cylinder and the combustion chamber immediately beyond the end of the cylinder head extending within the sleeve valve.

4. In an internal combustion engine, the combination, a cylinder, a cylinder head, the cylinder head extending within the cylinder, an annular space formed between the cylinder and the cylinder head, a fresh charge passage formed in the cylinder head, the said passage opening through and extending from the outer end of the cylinder head to a radially formed opening through the periphery of the said cylinder head, an opening formed in the cylinder in the same plane as the plane of the said radially formed opening of the fresh charge passage through the periphery of the cylinder head, the said opening in the cylinder extending to the cylinder wall at a point in the plane immediately beyond the inward extending end of the cylinder head, a sleeve valve arranged for reciprocatory movement within the cylinder, the head end of the said sleeve valve being adapted to operate in reciprocatory movement in a telescopic manner within the said annular space formed between the cylinder and the cylinder head, a piston arranged for reciprocatory movement within the sleeve valve, a crank shaft, a connection between the piston and the crank shaft, an opening formed in the cylinder in a plane substantially in line with the space immediately headward of the head of the piston when the said piston is at a stroke position of crank end dead center, two annular formed openings in the sleeve valve, said openings occupying separate planes at right angle to the axis of the sleeve valve, one opening adapted to register passage communication alternatingly between the annular opening in the periphery of the cylinder head and the annular opening in the cylinder in the same plane and between the annular opening in the cylinder and the chamber within the sleeve valve immediately crankward of the end of the extending cylinder head, the other of the two openings in the said sleeve valve adapted to register successively a passage communication between the annular opening in the cylinder in the plane of the piston head when the said piston is at crank end dead center and the chamber within the sleeve valve between the cylinder head and the piston head, means of actuating the sleeve valve in stroke time in ratio one to one with the piston and ignition means located in the cylinder head.

5. The combination, in a two stroke cycle internal combustion engine, a cylinder within which a sleeve valve is arranged for reciprocatory movement, a piston arranged for reciprocatory movement within the sleeve valve, means of actuating the sleeve valve in stroke relation in ratio one to one with the stroke movement of the piston within the sleeve valve, of a cylinder head formed in a depending manner within the sleeve valve and in such a way as to permit the sleeve valve reciprocating in a telescopic manner over the periphery of the cylinder head, of a fresh charge inlet duct being formed through the cylinder head and extending from an opening in the outward end of the cylinder head to an annular formed port opening formed through the side periphery of the cylinder head, of an annular formed port arranged in the cylinder in the same plane as is the said annular opening of the fresh charge inlet duct in the cylinder head, of an annular formed port arranged in the cylinder in the same plane as the space first crankwardly of the inward combustion chamber end of the cylinder head, of an annular port arranged in the cylinder in the same plane as the space immediately headward of the head of the piston arranged for reciprocatory movement within the sleeve valve when the said piston is in a position of crank end dead center, of a series of ports formed in the sleeve valve and adapted to register with the first two annular ports formed in the cylinder described herein, of a second series of ports being formed in the sleeve valve and adapted to register a port passage communication between the combustion chamber within the sleeve valve and the third annular port arranged in the cylinder described as being located in the plane of the head of the piston when the said piston is in a position of crank end dead center, and of ignition means located in the cylinder head.

In testimony whereof, I affix my signature.

EVERETT R. BURTNETT.